(12) United States Patent
Martins et al.

(10) Patent No.: US 12,344,790 B2
(45) Date of Patent: Jul. 1, 2025

(54) POTTING SEALANT COMPOUND FOR A PROTECTIVE LINING OF A PART, IN PARTICULAR AN AIRCRAFT PART, AND ASSOCIATED METHOD

(71) Applicant: Airbus Operations GmbH, Hamburg (DE)

(72) Inventors: Jose Martins, Hamburg (DE); Heinz Burock, Frankfurt am Main (DE); Ralph-Josef Hecktor, Frankfurt am Main (DE)

(73) Assignee: Airbus Operations GmbH, Hamburg (DE)

(*) Notice: Subject to any disclaimer, the term of this patent is extended or adjusted under 35 U.S.C. 154(b) by 97 days.

(21) Appl. No.: 18/185,565

(22) Filed: Mar. 17, 2023

(65) Prior Publication Data
US 2023/0295480 A1    Sep. 21, 2023

(30) Foreign Application Priority Data
Mar. 21, 2022    (EP) ..................................... 22163382

(51) Int. Cl.
*C09K 3/10*    (2006.01)
*B64D 37/06*    (2006.01)

(52) U.S. Cl.
CPC ............... *C09K 3/10* (2013.01); *B64D 37/06* (2013.01); *C09K 2200/0278* (2013.01)

(58) Field of Classification Search
CPC .......... B64D 37/06; B29C 70/78; B29C 39/10
See application file for complete search history.

(56) References Cited

U.S. PATENT DOCUMENTS

| 6,076,769 | A | * | 6/2000 | Gallegos | ................ | B60K 15/00 |
|  |  |  |  |  |  | 244/135 R |
| 2006/0078705 | A1 |  | 4/2006 | Glatkowski et al. |  |  |
| 2009/0114427 | A1 |  | 5/2009 | Feider et al. |  |  |
| 2016/0347038 | A1 | * | 12/2016 | Childress | ............... | B64D 37/32 |
| 2019/0002730 | A1 | * | 1/2019 | Busby | ....................... | B64F 5/10 |

FOREIGN PATENT DOCUMENTS

| CN | 109625296 | A | * | 4/2019 | ............ B64D 37/06 |
| DE | 102007054862 | A1 |  | 5/2009 |  |
| DE | 102021101981 | A1 |  | 7/2022 |  |

OTHER PUBLICATIONS

European Search Report for European Patent Application No. 22163382 dated Sep. 9, 2022; priority document.

* cited by examiner

*Primary Examiner* — Richard G Davis
(74) *Attorney, Agent, or Firm* — Greer, Burns & Crain, Ltd.

(57) ABSTRACT

A protective lining which includes a self-curing potting sealant compound. The lining can be used for an aircraft part, such as a tank wall liner which can be manufactured in-situ by casting the sealant into a prepared mold that is formed at least at the bottom side by the part to be protected by the tank wall liner. Specifically, for fuel tanks, the bottom portion forms the bottom side of the mold, whereas the ribs and stringers form a circumferential wall of the mold that prevents flowing of the potting sealant compound into neighboring molds.

12 Claims, 4 Drawing Sheets

POTTING SEALANT COMPOUND FOR A PROTECTIVE LINING OF A PART, IN PARTICULAR AN AIRCRAFT PART, AND ASSOCIATED METHOD

CROSS-REFERENCES TO RELATED APPLICATIONS

This application claims the benefit of European Patent Application No. 22 163 382.9 filed on Mar. 21, 2022, the entire disclosure of which is incorporated herein by way of reference.

FIELD OF THE INVENTION

The invention relates to a compound for a protective lining. The invention further relates to a lined part and a method for manufacturing the lined part.

BACKGROUND OF THE INVENTION

Different kinds of liners or patches are known from U.S. Pat. Pub. Nos. 2006/0078705 and 2009/0114427. Another patch is known from unpublished German patent application no. 10 2021 101 981.8 which relates to a smart repair patch.

Due to increasing consciousness for the environmental impact of air travel, the requirements for fuel safety as it relates to environmental damage also increases. Thus, there exists a need for improved fuel tanks that are able to mitigate the risk of fuel leakage even in case of mechanical damage to the tank. In other words, the fuel tanks failsafe capabilities shall be improved.

In addition, there is a general need for protective linings of (aircraft) parts to protect against—among other things—corrosion, impact damage or fracture.

SUMMARY OF THE INVENTION

It is an object of the invention to provide measures that allow protection of aircraft parts against adverse effects or conditions.

This object may be achieved by the subject-matter of one or more embodiments described herein. Additionally, advantageous embodiments are also described herein.

Specifically, the present invention provides a method for protectively lining a part, preferably an aircraft part, by:
a) preparing a mold that is defined on at least a bottom side by the part;
b) casting a self-curing potting sealant compound into the mold; and
c) levelling the sealant or letting the sealant self-level and letting the sealant cure in the mold.

Preferably, step b) comprises casting the self-curing potting sealant compound by pouring it out of a container, preferably via a spout, and/or by injecting it through a nozzle into the mold. Preferably, the nozzle atomizes the self-curing potting sealant and/or the nozzle has a bell shape that is getting arranged to cover a portion of the mold and the self-curing potting sealant is injected into the portion defined by the bell-shaped nozzle.

Preferably, the part comprises a structural part of an aircraft and/or a tank wall and in step a) the mold is being prepared such that the structural part and/or the tank wall form a bottom side of the mold.

Preferably, the part comprises a structural part of an aircraft and in step a) the mold is being prepared such that the structural part wholly or partly forms a circumferential wall of the mold.

Preferably, the self-curing potting sealant compound has a viscosity greater than 0 pascal seconds (Pa·s) up to and including 100 Pa·s, preferably up to and including 80 Pa·s, more preferably up to and including 50 Pa·s.

Preferably, step b) comprises casting of a self-curing potting sealant compound that includes fibers or fiber material pieces.

Preferably, a fiber ply is being placed into the mold as a reinforcement layer. Preferably, the fiber ply is placed on the part or on top of uncured sealant.

Preferably, self-curing potting sealant compound is poured a second time into the mold, preferably on uncured sealant or a reinforcement layer.

The invention also provides a protectively lined aircraft part obtainable by a preferred method. Preferably, the part is a tank wall for a fuel tank of an aircraft that encloses a tank volume for fuel.

The invention further provides a fuel tank for an aircraft, the fuel tank comprising a tank wall obtainable by a preferred method or a preferred protectively lined aircraft part.

The invention additionally provides an aircraft comprising a preferred protectively lined aircraft part or a preferred fuel tank.

The invention also provides a self-curing potting sealant compound having a viscosity of greater than 0 pascal seconds (Pa·s) up to and including 100 Pa·s, preferably up to and including 80 Pa·s, more preferably up to and including 50 Pa·s. The invention provides a use of a preferred self-curing potting sealant compound in a method for manufacturing any of a preferred protectively lined aircraft part, a fuel tank of claim 11 or an aircraft.

Currently sealants are applied via brush, roller, cartridges, spatula or Jurblami bells (special nozzles for cartridges that make a defined blob of sealant onto fasteners). The viscosity is around 250 pascal seconds (Pa·s). This can be measured using a spindle viscometer. The sealant used herein is chosen such that it is castable. A suitable fluid-viscosity is preferably below 50 Pa·s. It is also possible to add fibers (glass, aramid, polyester, etc.) to improve the mechanical performance of the final sealant.

The sealant compound can be quickly applied without adaption to a specific geometry and without rework (such as preformed linings). Fibers can be added after the potting process but before the sealant has cured or the tack free time has been reached. It is also possible to integrate fiber plies within the structure in the form of fiber-cutouts/seals/etc. This can be done before, when the sealant is still liquid or even after curing of the sealant. It is also possible to manufacture multiple layers of plies in this manner. The fibers can be glass, aramid, polyester or other compounds (e.g. seals that are fluorocarbon based).

The sealant potting compound is liquid enough to be able to flow within a specific predetermined area. In the context of aircraft this is preferably an area between two ribs/frames and stringers. The sealant can be applied on the inside and/or the outside of the aircraft, e.g. the fuel tank. The sealant potting compound can protect against impacts/defects and finally avoid leakages (fluid or gas). It also allows surface protection.

The invention further provides a tank wall liner for a tank, preferably of an aircraft, the tank having a tank wall that encloses a tank volume, wherein the tank wall liner comprises a liner body made of a liner material, the liner body comprising a mounting surface configured to be installed facing a tank wall and at least one sealing surface configured to be installed facing another tank wall liner, wherein the liner material includes a cured sealant that is suitable for jet fuel.

For fuel tanks a goal is to improve the failsafe capabilities of fuel tanks, preferably for aircraft. a tank wall liner for a tank, preferably of an aircraft.

One aspect relates to a tank lined with a tank wall liner and an aircraft equipped with those apparatus. Another aspect relates to manufacturing methods for the tank and the tank wall liner.

Preferably, the liner material includes at least one reinforcement layer made of a textile or fiber material.

Preferably, the reinforcement layer is arranged entirely within the cured sealant or wherein the reinforcement layer protrudes from at least one sealing surface.

Preferably, the reinforcement layer is arranged in a thickness direction of the liner body in any or one of the following portions: in the lower third, the medium third, or the upper third of the liner body.

Preferably, the liner body comprises a plurality of cut-outs or through-holes that are suitable for accommodating fasteners of the tank.

Preferably, the cut-outs or through-holes are only into or through the cured sealant or both the cured sealant and the reinforcement layer.

The invention provides a tank, preferably for an aircraft, the tank comprising a tank wall that encloses a tank volume for fuel, preferably jet fuel, wherein a plurality of preferred tank wall liners are mounted to the tank wall on the inside of the tank volume so as to form a lined tank wall portion that is configured to seal the tank wall from the jet fuel.

Preferably, the tank wall forms a fuselage section, preferably an aft fuselage section, of a fuselage of an aircraft.

Preferably, the tank wall liners are adhesively bonded to the tank wall, preferably with a sealant.

Preferably, the tank wall comprises a frame structure and a skin that is supported by the frame structure, wherein the tank wall liners are mounted between parts of the frame structure and to the skin.

Preferably, the frame structure comprises a plurality of ribs and stringers, wherein a pair of ribs and stringers form a contoured area, and the tank wall liner is shaped to match the contoured area.

Preferably, laterally adjacent tank wall liners form a joint that is sealed with sealant.

The invention provides an aircraft comprising a preferred tank.

The invention provides a method for manufacturing a tank for an aircraft, the method comprising:
preparing a tank volume by forming a tank wall;
applying a self-curing sealant to a portion of the tank wall on the inside of the tank volume; and
arranging a plurality of tank wall liners on the sealant covered portion so as to form a lined tank wall portion that is configured to seal the tank wall from the jet fuel.

The invention provides a method for manufacturing a tank wall liner, the method comprising:
a) preparing a layer of sealant;
b) curing or letting cure the sealant.

Preferably, the method comprises a step c) of laying a layer of fiber or textile material on the sealant layer cured in step b).

Preferably, the method comprises a step d) of applying another layer of sealant on the fiber or textile layer and performing step b) on that layer.

Preferably, the steps b) to d) are repeated until a predetermined number of fiber or textile layers are embedded between sealant layers.

The tank wall liners allow for enhanced protection against fuel leakages. The tank wall liners (also called sealing patches) can be made of a sealant that is generally used in aviation. Typical examples are polysulfide or polythioether based sealants. In another embodiment the patches may also be made from fluoroelastomeric materials. The patches may be reinforced using textiles or fibers, e.g. glass fibers, polyester fibers or aramid fibers. The tank wall liners can be separately manufactured and subsequently installed on the inside of a corresponding tank. This also allows retrofitting of tanks that are already in service. The tank wall liners are preferably bonded to the tank wall with a self-curing sealant, that may be of the same type or the same sealant that forms the patches. The tank wall liners are preferably made in rectangular (including square), circular or ellipsoidal shapes and can be cut during installation to fit the specific location in the tank.

The tank wall liners preferably have a thickness of 0.5 mm to 12 mm, more preferably a thickness of 1 mm to 4 mm. The liner may have a length of 200 mm to 700 mm, more preferably a length of 400 mm to 600 mm. The liner may have a width of 50 mm to 500 mm, preferably of 100 mm to 300 mm.

The tank wall liners may be formed as plates or plate-like elements. The tank wall liners can also have one or more legs, when viewed in a cross-section. The legs may protrude perpendicularly from the main part to preferably form a U-shape. The main part and/or the one or more legs may include or exclude a reinforcement layer, as desired by the application.

In order to improve failsafe capabilities of fuel tanks (20), preferably for aircraft (10), and in particular with respect to mitigating the risk of fuel leakage even in case of mechanical damage to the tank, a tank wall liner (34) is proposed. The tank wall liner (34) comprises a liner body (38) made of a liner material. The liner material is a sealant or composite of sealant and fiber/textile materials. Multiple tank wall liners (34) are installed on the tank wall (22) and form a lining surface that seals the fuel in the tank (20) from the tank skin (30).

BRIEF DESCRIPTION OF THE DRAWINGS

It should be noted that while the invention is described with respect to lining of a tank wall this serves only as an example. The ideas and measures disclosed herein are also applicable to different parts of an aircraft. Embodiments of the invention are described in more detail with reference to the accompanying schematic drawings that are listed below.

DETAILED DESCRIPTION OF THE PREFERRED EMBODIMENTS

Figure 1:
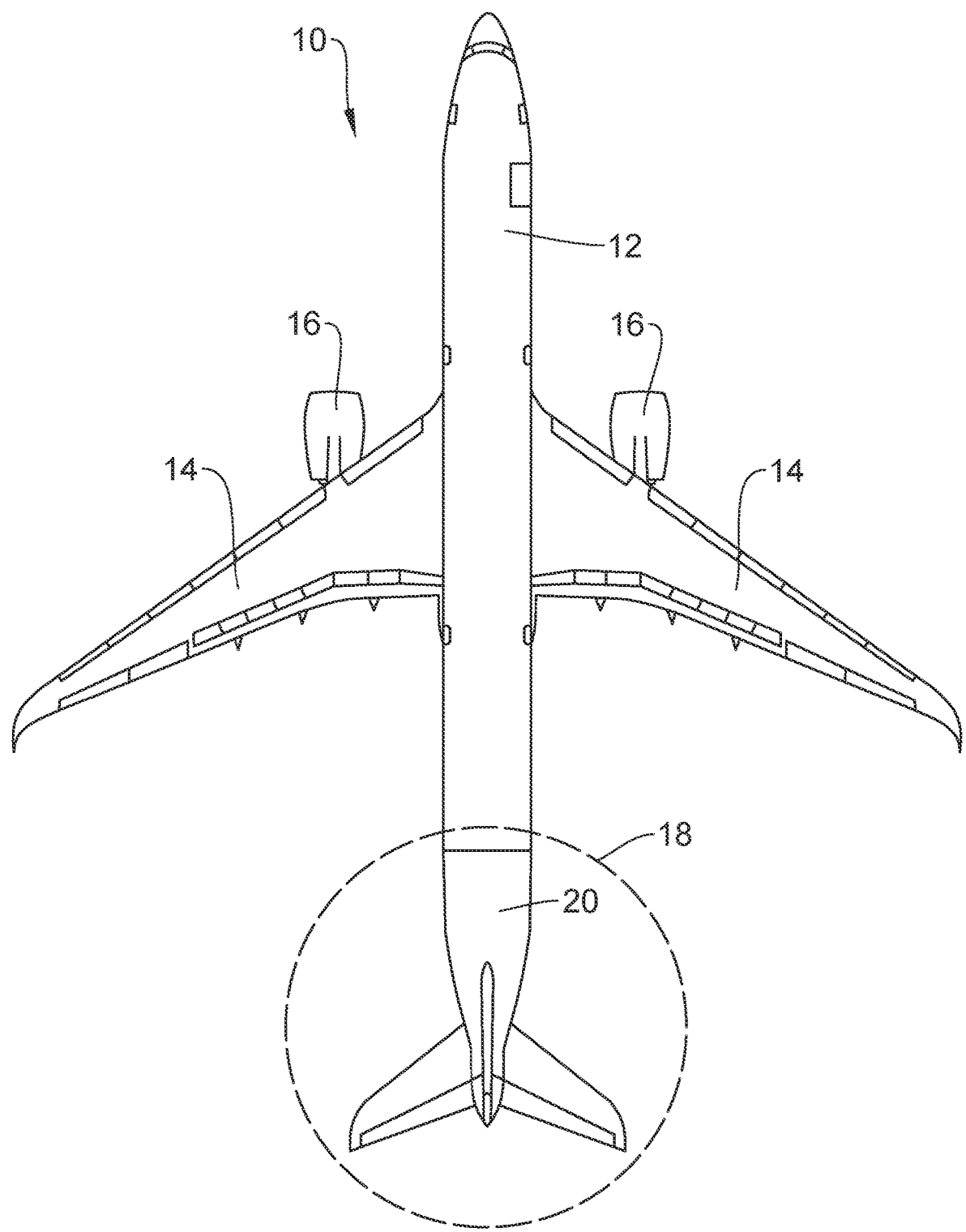
FIG. 1 depicts an embodiment of an aircraft.

Referring to FIG. 1, an aircraft 10 has a fuselage 12 and a pair of wings 14 attached to the fuselage 12. The aircraft 10 also includes a plurality of engines 16 that are attached to the wings 14. The fuselage 12 has an aft section 18 that includes horizontal and vertical tail plane and an additional fuel tank 20. The additional fuel tank 20 includes jet fuel for the engines 16 and therefore allows a range extension compared to conventional airplanes.

Figure 2:
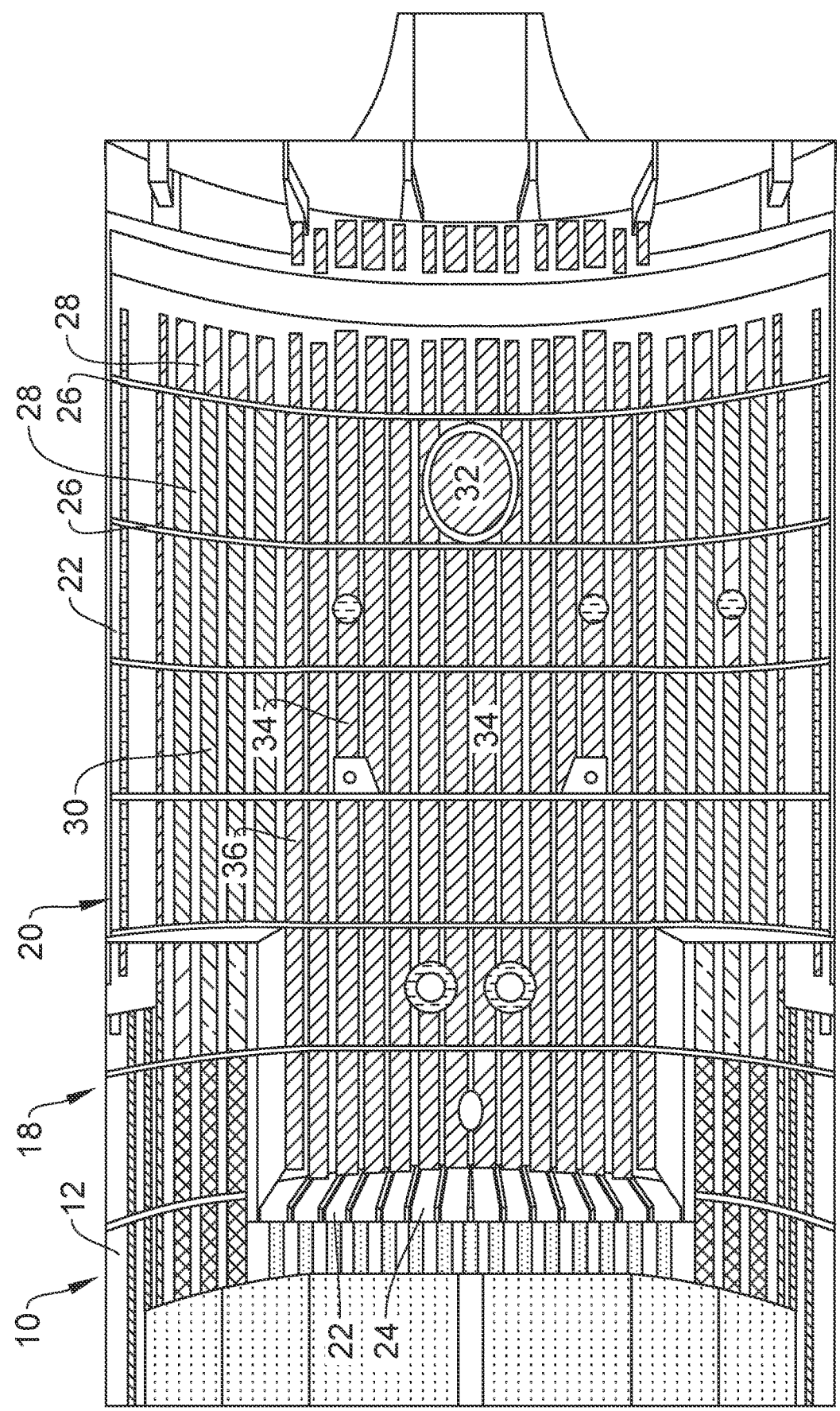
FIG. 2 depicts a top view of an inside of a tank volume with tank wall lining.

FIG. 2 depicts the fuel tank 20 in more detail. In general, the fuel tank 20 is configured in the usual manner. The fuel tank 20 includes a tank wall 22. The tank wall 22 encloses and thereby defines a tank volume for the jet fuel.

The tank wall 22 is on the one hand formed by a part of the fuselage 12 and additional wall portions 24. The tank wall 22 comprises a plurality of ribs 26 and stringers 28 which support a skin 30. The ribs 26, the stringers 28 and the skin 30 are examples of structural parts. The skin 30 may be made of light weight metal or fiber reinforced composite materials.

The ribs 26 and stringers 28 define mostly rectangular zones in which the skin 30 is accessible from the inside of the fuel tank 20. In addition, a man-hole portion 32 may be formed in the tank wall 22 to allow access for maintenance.

As depicted in FIG. 2, a plurality of tank wall liners 34 are arranged so as to cover the skin 30. The tank wall liners 34 may also be arranged so as to cover the ribs 26 and/or stringers 28 (not depicted). The tank wall liners 34 are preferably arranged on a bottom portion 36 of the tank wall 22. The bottom portion 36 roughly includes those sections of the tank wall 22 that face the ground and may be impacted by debris from or contact the runway during take-off. It should be noted that the tank wall liners 34 may also cover up to the entire inner surface of the tank wall 22.

FIG. 3 through FIG. 8 depict different embodiments of the tank wall liner 34 in more detail from the top (left) and in a cross-section (right).

Figure 3:
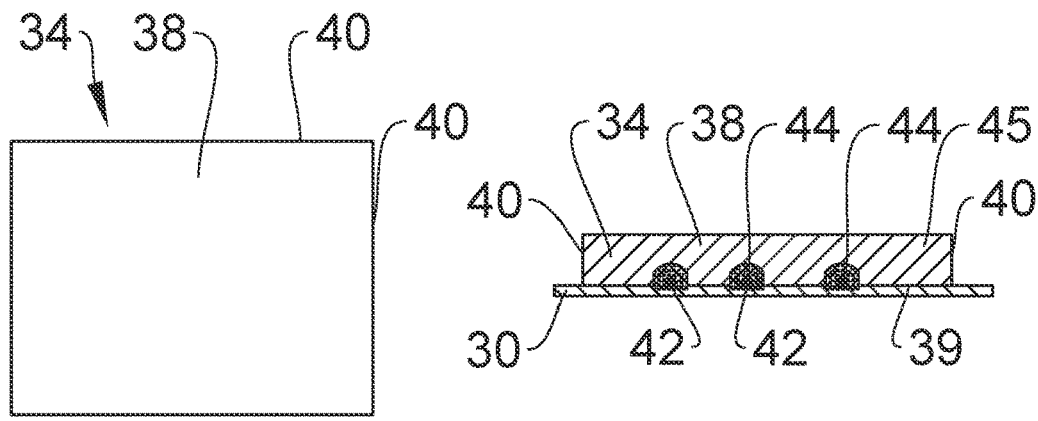
FIG. 3 depicts an individual tank wall liner in a top (left) and in a cross-section (right) according to one or more embodiments of the present invention.

In FIG. 3, the tank wall liner 34 comprises a liner body 38. The liner body 38 has a roughly rectangular shape, that is preferably fitted to the grid defined by the ribs 26 and stringers 28. The liner body 38 may also have a different shape, for example a shape that fits the man-hole portion 32 or other portions. The liner body 38 is roughly plate-like and has a thickness of a couple of mm.

The liner body 38 includes a mounting surface 39. The mounting surface 39 is arranged so that it can face the tank wall 22 and be bonded thereto. In addition, the liner body 38 includes a plurality of sealing surfaces 40.

The sealing surfaces 40 are arranged such that in an installed position they can face another sealing surface of another tank wall liner 34. The sealing surfaces 40 are arranged on a circumferential portion of the tank wall liner 34.

The liner body 38 may have a plurality of cut-outs 42 that can accommodate fasteners 44 of the tank wall 22, i.e. of the ribs 26 and/or stringers 28.

The liner body 38 is made of a liner material that consists entirely of a cured sealant 45.

Subsequently, the further embodiments of the tank wall liner 34 are only described insofar as they differ from the previously described embodiment(s).

Figure 4:
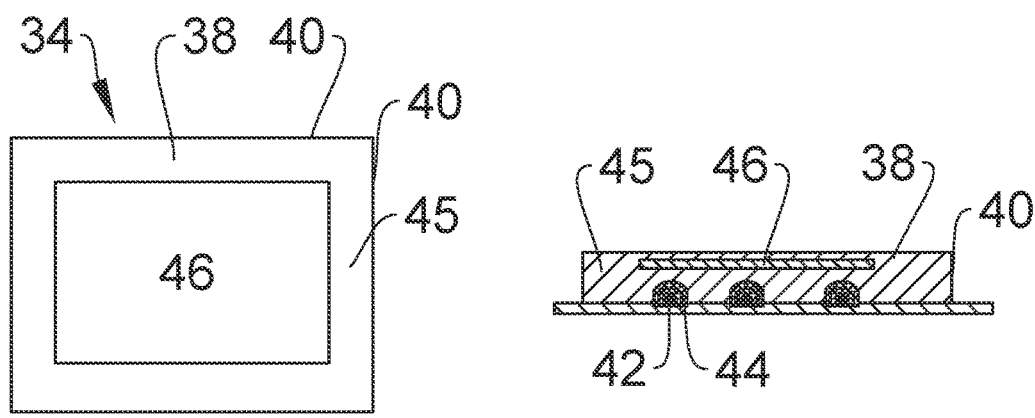
FIG. 4 depicts an individual tank wall liner in a top (left) and in a cross-section (right) according to one or more embodiments of the present invention.

Referring to FIG. 4, the liner body 38 includes a reinforcement layer 46 that is made of fiber or textile material. Preferably, the reinforcement layer 46 is made of glass or aramid fibers. Thus, the liner material in this embodiment is a fiber reinforced material. As depicted in FIG. 4, the reinforcement layer 46 is entirely enclosed within the cured sealant. Preferably, the reinforcement layer is arranged in the upper third of the liner body 38 along the thickness direction. The distance from the sealing surface 40 to the reinforcement layer 46 is about 10 mm to 30 mm.

Figure 5:
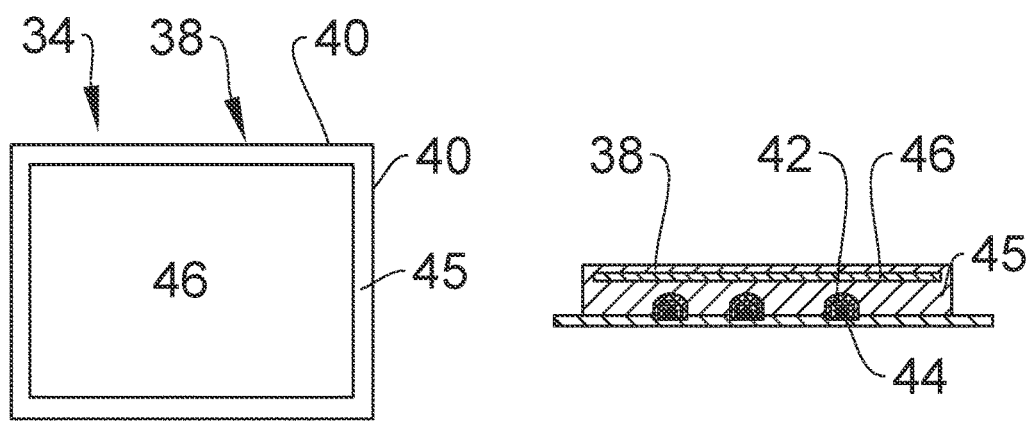
FIG. 5 depicts an individual tank wall liner in a top (left) and in a cross-section (right) according to one or more embodiments of the present invention.

Referring to FIG. 5, the liner body 38 is almost identical to the embodiment of FIG. 4. However, here the distance from the sealing surface 40 to the reinforcement layer 46 is about 3 mm to 8 mm.

Figure 6:
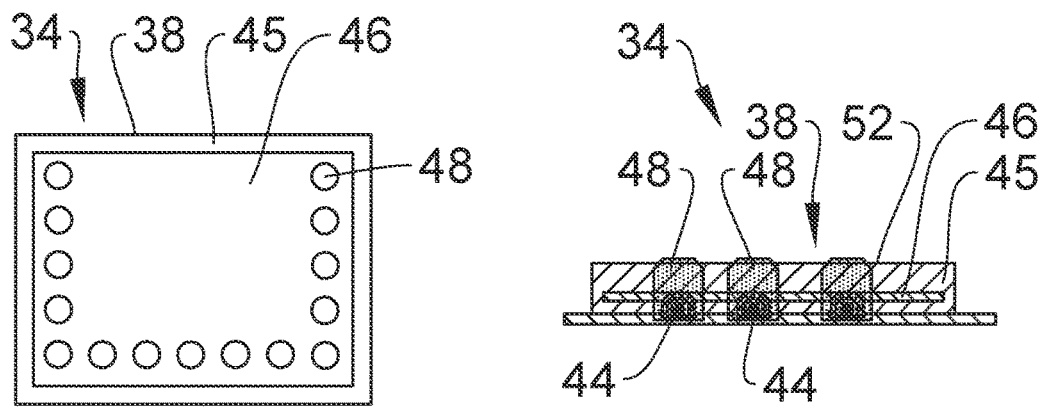
FIG. 6 depicts an individual tank wall liner in a top (left) and in a cross-section (right) according to one or more embodiments of the present invention.

Referring to FIG. 6, the liner body 38 is similar to the embodiment of FIG. 5, but it could also be configured like the embodiments of FIG. 3 or FIG. 4. This embodiment includes a plurality of through-holes 48 that are arranged such that they go through the sealant and the reinforcement layer 46.

Figure 7:
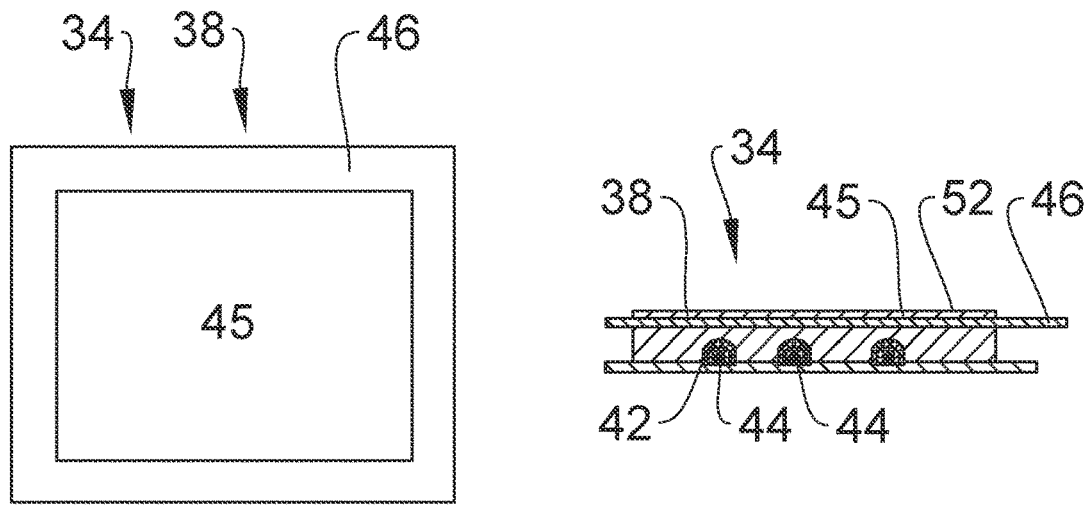
FIG. 7 depicts an individual tank wall liner in a top (left) and in a cross-section (right) according to one or more embodiments of the present invention.

Referring to FIG. 7, the liner body 38 is again similar to the previous embodiments, with the distinction that the reinforcement layer 46 protrudes from the sealing surface 40. This embodiment may also be made with through-holes 48 similar to the previous embodiment of FIG. 6.

Figure 8:
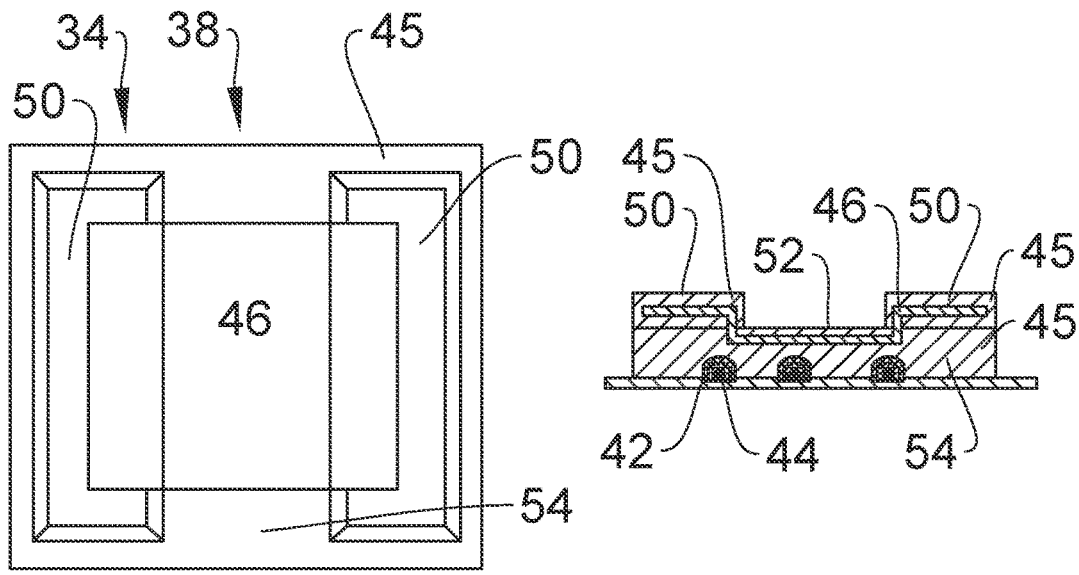
FIG. 8 depicts an individual tank wall liner in a top (left) and in a cross-section (right) according to one or more embodiments of the present invention.

Referring to FIG. 8, the liner body 38 comprises a plurality of protrusions 50 that protrude from the inner surface 52. The inner surface 52 is opposite the mounting surface 39. When viewed in a cross-section the reinforcement layer 46 is embedded in the protrusions 50 and the main body 54.

It should be noted that in other variants that are not explicitly depicted, the reinforcement layer 46 may be arranged in the center third or the bottom third of the main body 54. Alternatively, or additionally, there could be more than one reinforcement layer.

Subsequently, installation of the tank wall liners 34 is described in more detail. Initially, a wet self-curing sealant is applied to the tank wall 22 or rather the portions that should be lined, e.g. the bottom portion 36. Then a tank wall liner 34 is arranged on the sealant, pressed on and left to cure. This process is repeated until the entire desired portion, such as the bottom portion 36, is covered with the tank wall liners 34 and forms a lining surface without gaps for the jet fuel. Depending on the configuration of the tank wall liner 34, the ribs 26 and/or stringers 28 may also be covered with sealant. It is also possible to form the protruding reinforcement layer 46 (FIG. 7) around different structures within the tank volume and fix them with sealant.

The tank wall liners 34 may be manufactured in different ways. In one embodiment, a self-curing sealant is applied to a form that corresponds to the desired shape. After curing the tank wall liner 34 is ready. In another embodiment, a reinforcement layer is put on top of the cured sealant and another layer of sealant is applied. This can be repeated multiple times, until the desired configuration of the tank wall liner 34 is achieved.

Referring back to FIG. 2, the tank wall 22, the ribs 26 and stringers 28 collectively define a mold. Specifically, the bottom portion 36 is arranged at the bottom side of the mold, whereas the ribs 26 and stringers 28 form a circumferential wall of the mold. In case the circumferential wall has any openings, they can be plugged with an appropriate piece of sealant or other member to prevent potting sealant compound from leaving the mold.

Subsequently, instead of placing tank wall liners 34, a self-curing potting sealant compound is poured into the mold. The uncured sealant settles and can be self-levelling. It is also possible to use an appropriate tool to level the uncured sealant. In addition, the sealant may include fibers or pieces of fiber materials. This method is particularly useful in such areas, where a large number of fasteners would require a complicated geometry of the tank wall liner 34.

In a variant, a fiber ply is placed on the bottom portion 36. The fiber ply is shaped to match the shape of the mold. Subsequently potting sealant compound is poured in the mold and before the sealant is fully cured another fiber ply may be placed on the almost cured sealant. Again potting sealant compound is poured into the mold. This process can be repeated several times until the desired height within the mold is reached.

With the above-described methods the tank wall liner 34 is basically manufactured in-situ. The thickness of the tank wall liner 34 is preferably 1 mm to 8 mm. In a variant, seal caps can be put on fasteners 44 or sealant can be injected using a shaped nozzle to cover the fasteners 44 with sealant. Subsequently, the self-curing potting sealant compound is cast onto the covered fasteners 44. It should be noted that the in-situ casting method of the tank wall liner 34 may be combined with the method of preparing different patches that are then introduced into the mold.

For example, referring to FIG. 8 a part of the main body 54 can be cast. The protrusions 50 are prepared separately as cured patches that are joined together by the reinforcement layer 46. The protrusions 50 are introduced into the mold and the reinforcement layer 46 is laid on top of the cast sealant compound. Now the remaining potting sealant compound is cast onto the reinforcement layer 46 to form the remainder of the main body 54, and the protrusions 50 are laid into the uncured sealant to be cured together with the main body 54.

In order to improve the manufacture of protective lining for aircraft parts, the invention proposes to use a self-curing potting sealant compound. As an example, a tank wall liner (34) can be manufactured in-situ by casting the sealant into a prepared mold that is formed at least at the bottom side by the part to be protected by the tank wall liner (34). Specifically, for fuel tanks (20), the bottom portion (36) forms the bottom side of the mold, whereas the ribs (26) and stringers (28) form a circumferential wall of the mold that prevents flowing of the potting sealant compound into neighboring molds.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 engine
18 aft section
20 fuel tank
22 tank wall
24 wall portion
26 rib (structural part)
28 stringer (structural part)
30 skin (structural part)
32 man-hole portion
34 tank wall liner
36 bottom portion
38 liner body
39 mounting surface
40 sealing surface
42 cut-out
44 fasteners
45 cured sealant
46 reinforcement layer
48 through-holes
50 protrusion
52 inner surface
54 main body

The invention claimed is:

1. A method for protectively lining a part, the method comprising:
   a) preparing a mold that is defined on at least a bottom side by a part;
   b) casting a self-curing potting sealant compound into the mold; and
   c) levelling the self-curing potting sealant or letting the self-curing potting sealant self-level and letting the self-curing potting sealant cure in the mold,
   wherein either:
      in step b) the self-curing potting sealant compound comprises fibers or fiber material pieces,
      a fiber ply is being placed into the mold as a reinforcement layer, or
      both.

2. The method of claim 1, wherein step b) comprises:
   casting the self-curing potting sealant compound by pouring the self-curing potting sealant out of a container, or by injecting the self-curing potting sealant through a nozzle into the mold, or both.

3. The method of claim 1, wherein the part comprises a structural part of an aircraft, or a tank wall, or both, and
   wherein in step a) the mold is prepared such that the structural part, or the tank wall, or both form the bottom side of the mold.

4. The method of claim 1, wherein the part comprises a structural part of an aircraft, and
   wherein in step a) the mold is prepared such that the structural part wholly or partly forms a circumferential wall of the mold.

5. The method of claim 1, wherein the self-curing potting sealant compound comprises a viscosity greater than 0 pascal seconds (Pa·s) up to and including 100 Pa·s.

6. The method of claim 1, wherein the fiber ply is placed on the part or on top of uncured sealant.

7. The method of claim 1, further comprising, after step c), pouring the self-curing potting sealant compound into the mold.

8. A protectively lined aircraft part obtained by the method of claim 1.

9. The protectively lined aircraft part of claim 8, wherein the protectively lined aircraft part is a tank wall for a fuel tank of an aircraft that encloses a tank volume for fuel.

10. A fuel tank for an aircraft, the fuel tank comprising the protectively lined aircraft part of claim 8.

11. An aircraft comprising the protectively lined aircraft part of claim 8.

12. The method of claim 1, wherein the self-curing potting sealant compound is poured a second time into the mold on uncured sealant or the reinforcement layer.

* * * * *